United States Patent
Janarthanam et al.

(10) Patent No.: US 11,884,327 B2
(45) Date of Patent: Jan. 30, 2024

(54) VIBRATION DAMPENING VEHICLE SUBFRAME

(71) Applicant: Ford Global Technologies, LLC, Dearborn, MI (US)

(72) Inventors: Suriyaprakash Ayyangar Janarthanam, Canton, MI (US); Do Young Chung, Windsor (CA); Jason C. Marcath, Dearborn, MI (US); Suma Rani Das, Garden City, MI (US); Afif Sabbagh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 17/316,785

(22) Filed: May 11, 2021

(65) Prior Publication Data
US 2022/0363317 A1 Nov. 17, 2022

(51) Int. Cl.
| | | |
|---|---|---|
| B62D 21/03 | (2006.01) | |
| B62D 21/17 | (2006.01) | |
| B60L 53/20 | (2019.01) | |
| B60L 50/60 | (2019.01) | |
| B62D 25/02 | (2006.01) | |
| B62D 3/12 | (2006.01) | |
| B60K 6/28 | (2007.10) | |

(52) U.S. Cl.
CPC .............. *B62D 21/17* (2013.01); *B60L 50/60* (2019.02); *B60L 53/20* (2019.02); *B62D 3/12* (2013.01); *B62D 21/03* (2013.01); *B62D 25/025* (2013.01); *B60K 6/28* (2013.01); *B60Y 2200/91* (2013.01); *B60Y 2200/92* (2013.01)

(58) Field of Classification Search
CPC ........ B62D 21/17; B62D 21/03; B62D 21/11; B62D 25/025; B62D 25/082; B62D 25/08; B62D 3/12; B60L 53/20; B60K 6/28; B60K 1/04; B60K 1/00; B60K 2001/001; B60K 2001/0404; B60K 2001/0438; B60Y 2200/91; B60Y 2200/92
See application file for complete search history.

(56) References Cited

U.S. PATENT DOCUMENTS

| | | | |
|---|---|---|---|
| 7,976,037 B2 * | 7/2011 | Yoshida ................... | B62D 3/12 280/124.109 |
| 8,657,365 B2 * | 2/2014 | Amano ................ | B62D 21/152 296/187.11 |

(Continued)

FOREIGN PATENT DOCUMENTS

| | | | |
|---|---|---|---|
| CN | 208789774 U | 4/2019 | |
| EP | 1504983 B1 * | 6/2006 | ............. B62D 21/11 |

*Primary Examiner* — Steve Clemmons
(74) *Attorney, Agent, or Firm* — Lorne Forsythe; Bejin Bieneman PLC

(57) ABSTRACT

A vehicle includes a body including a first frame rail and a second frame rail and a cross-brace directly connected to the first frame rail and the second frame rail. A powertrain-electrification component is supported by the cross-brace. A vehicle subframe is directly connected to the cross-brace. A vehicle-steering gear is connected to the subframe. The direct connection of the subframe to the cross-brace dampens vibration, e.g., road vibration and noise, in the subframe to reduce noise, vibration, and harshness transferred to a vehicle occupant through the vehicle-steering gear.

20 Claims, 9 Drawing Sheets

(56) References Cited

U.S. PATENT DOCUMENTS

| | | | | |
|---|---|---|---|---|
| 9,643,653 | B2* | 5/2017 | Groen | B62D 21/152 |
| 9,776,663 | B1* | 10/2017 | Craig | B60K 5/12 |
| 9,937,781 | B1* | 4/2018 | Bryer | B62D 35/02 |
| 10,494,034 | B2* | 12/2019 | Makowski | H01M 50/249 |
| 10,539,961 | B2* | 1/2020 | Christiansen | G08G 1/166 |
| 11,584,443 | B2* | 2/2023 | Anzai | B62D 27/02 |
| 2004/0079569 | A1 | 4/2004 | Awakawa | |
| 2008/0078603 | A1* | 4/2008 | Taji | H02K 5/00 |
| | | | | 180/312 |
| 2010/0101885 | A1* | 4/2010 | Nozaki | B60K 1/00 |
| | | | | 180/232 |
| 2012/0292124 | A1* | 11/2012 | Yamashita | B62D 21/155 |
| | | | | 180/291 |
| 2012/0305322 | A1 | 12/2012 | Schaal | |
| 2014/0311812 | A1* | 10/2014 | Kambayashi | B60K 1/00 |
| | | | | 180/65.1 |
| 2015/0360716 | A1* | 12/2015 | Dagli | B62D 5/04 |
| | | | | 180/446 |
| 2016/0214475 | A1* | 7/2016 | Rawlinson | B60L 50/51 |
| 2019/0126989 | A1* | 5/2019 | Okura | B62D 25/08 |
| 2019/0375282 | A1* | 12/2019 | Lee | H01M 8/04029 |
| 2020/0317039 | A1 | 10/2020 | Chung et al. | |
| 2020/0391797 | A1* | 12/2020 | Viereck | B60K 1/00 |
| 2022/0144343 | A1* | 5/2022 | Schantl | B62D 27/065 |

* cited by examiner

VIBRATION DAMPENING VEHICLE SUBFRAME

BACKGROUND

An electric vehicle includes a battery that powers the vehicle, including propulsion of the vehicle. For example, wheels of the vehicle are powered by one or more electric motors that are powered by the battery. Examples of electric vehicles include a battery-electric vehicle (BEV), a hybrid-electric vehicle (HEV), a plug-in hybrid electric vehicles (PHEV), etc.

DETAILED DESCRIPTION

Figure 1:
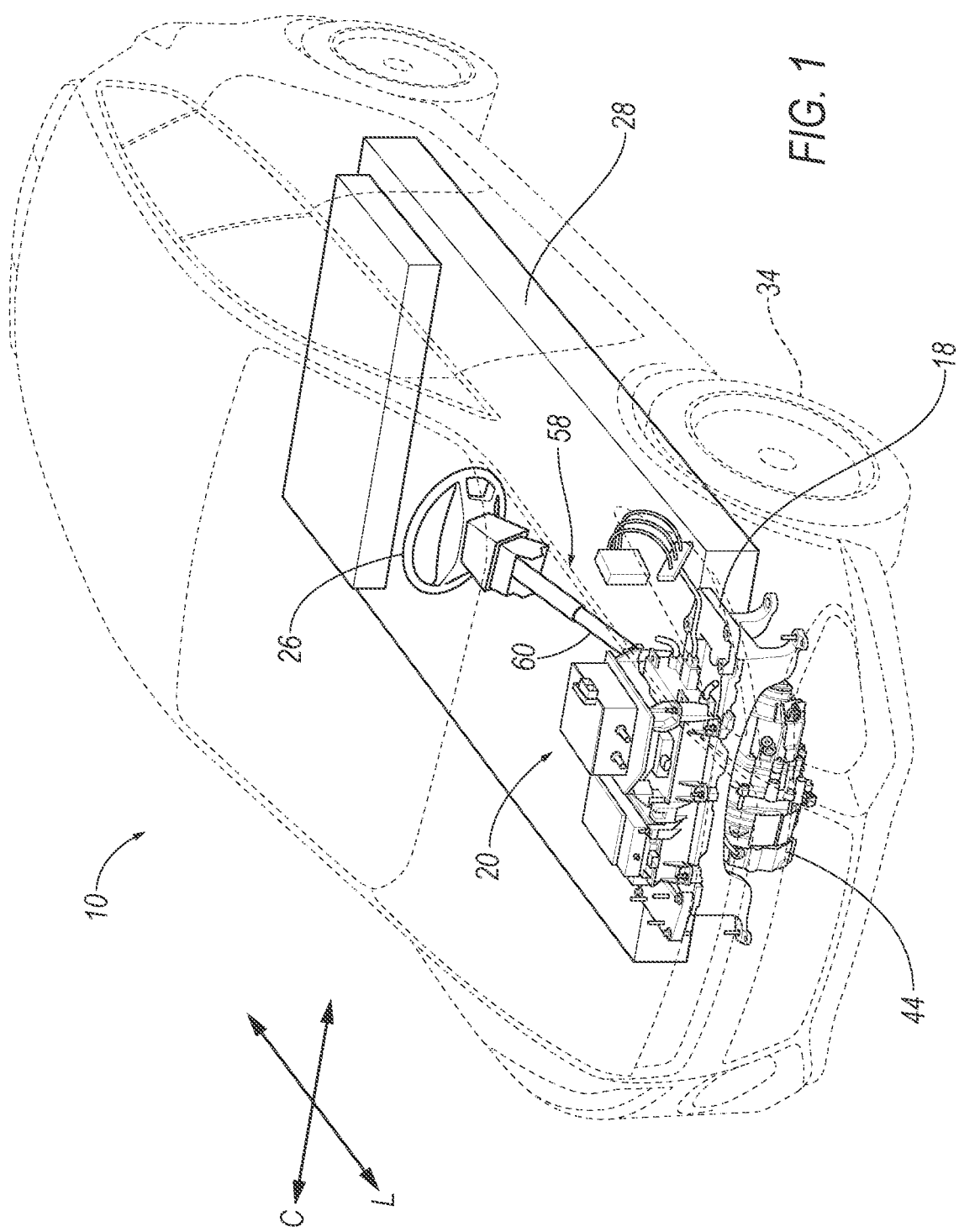
FIG. 1 is a perspective view of a vehicle with a cross-brace shown in solid lines with powertrain-electrification components supported on the cross-brace.

With reference to the figures in which common numerals are used to identify common elements, a body 12 for a vehicle 10, i.e., a vehicle body 12, is generally shown. The vehicle body 12 includes a first frame rail 14 and a second frame rail 16 spaced from each other in a cross-vehicle direction C and each elongated in a vehicle-longitudinal direction L. The vehicle body 12 includes a cross-brace 18 directly connected to the first frame rail 14 and the second frame rail 16. The vehicle 10 includes a powertrain-electrification component 20 supported by the cross-brace 18. The vehicle 10 includes a subframe 22 directly connected to the cross-brace 18 and a vehicle-steering gear 24 connected to the subframe 22.

Since the subframe 22 is directly connected to the cross-brace 18 and the vehicle-steering gear 24 is connected to the subframe 22, the cross-brace 18 dampens vibration of the subframe 22 and reduces vibration transmitted to the vehicle-steering gear 24 to reduce noise, vibration, and harshness (NVH) felt by the vehicle occupant. Specifically, the dampening of vibration reduces vibration felt by the occupant through a steering wheel 26 connected to the vehicle-steering gear 24, as described further below. The cross-brace 18, as set forth above, supports the powertrain-electrification component 20 and, in addition, provides a path for vibration dampening by being directly connected to the first frame rail 14 and the second frame rail 16. Accordingly, direct connection of the subframe 22 to the cross-brace 18 dampens vibration to reduce vibration delivered to the vehicle-steering gear 24 through the subframe 22 from the rest of the vehicle 10, such as road vibrations from wheels of the vehicle 10.

The vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 is an electric vehicle having an electrically-powered powertrain, as described below. The electrically-powered powertrain may be powered by an electric-vehicle battery 28. As examples, the vehicle 10 may be a battery-electric vehicle (BEV), a hybrid-electric vehicle (HEV), a plug-in hybrid electric vehicle (PHEV), etc.

The vehicle body 12 may having a unibody architecture in which the frame rails 14, 16, rockers 30, pillars 32, roof rails, etc., are unitary, e.g., by welding, bonding, adhesive, etc. The example vehicle body 12 shown in the figures has a unibody architecture. Alternatively, the body 12 may have any suitable architecture. The body 12 may be of any suitable material, for example, steel, aluminum, and/or fiber-reinforced plastic, etc.

Figure 2:
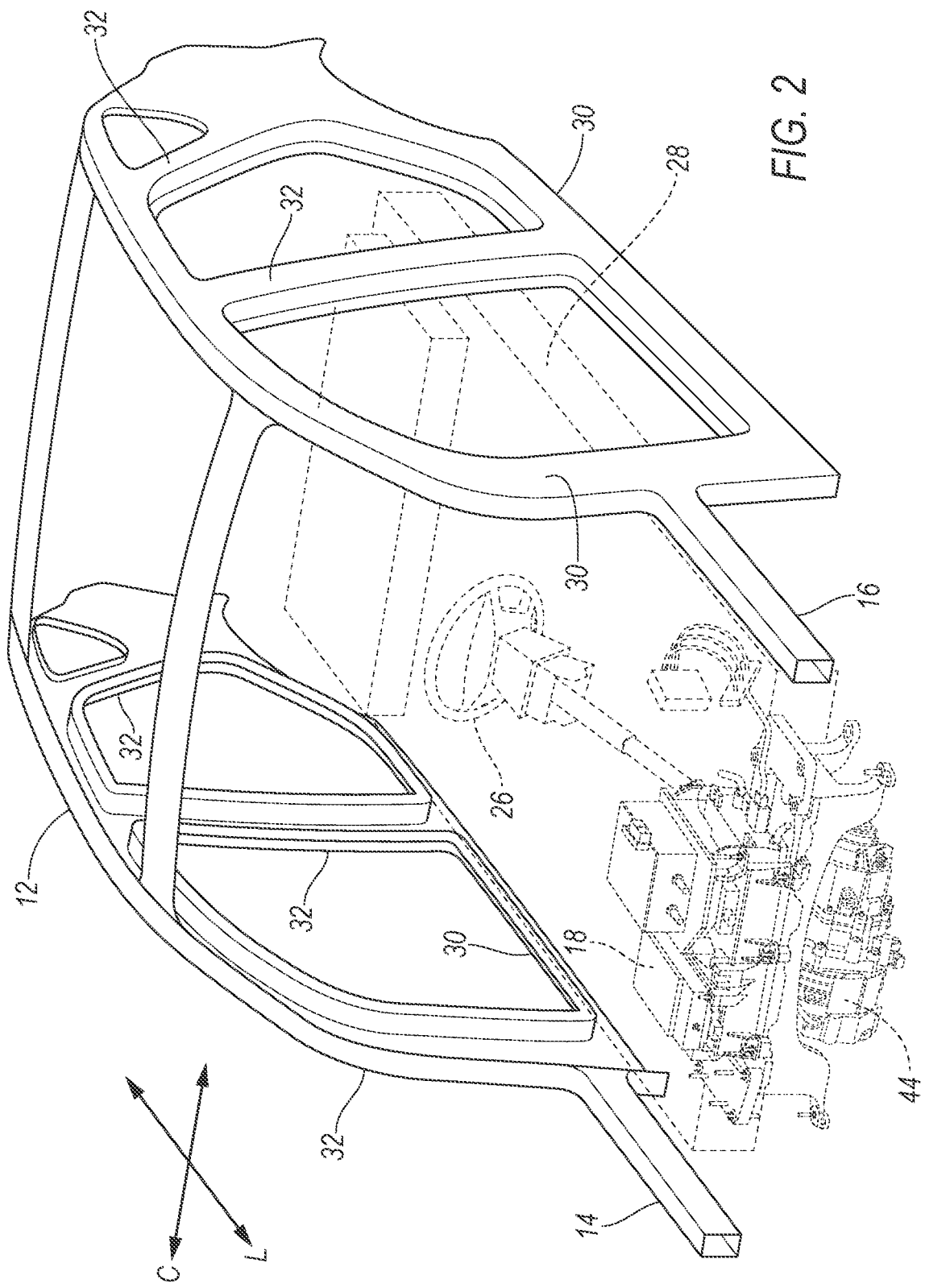
FIG. 2 is a perspective view of a body of the vehicle.

With reference to FIG. 2, the vehicle body 12 includes the first frame rail 14, the second frame rail 16, rockers 30, pillars 32 (specifically A-pillars, B-pillars, C-pillars), etc. The first frame rail 14 and the second frame rail 16 are on opposite sides of the vehicle body 12, i.e., on opposite sides of a longitudinal midline of the vehicle 10. The first frame rail 14 and the second frame rail 16 may be at a front end of the vehicle 10. As set forth above, the first frame rail 14 and the second frame rail 16 are spaced from each other in a cross-vehicle direction C and are each elongated in a vehicle-longitudinal direction L. The first frame rail 14 and the second frame rail 16 may be at the same height and/or may the same distance outboard of the longitudinal midline of the vehicle 10. The first frame rail 14 and the second frame rail 16 may be parallel to each other.

The vehicle body 12 may, for example, include an A-pillar, a B-pillar, and a C-pillar on each side of the vehicle 10. The A-pillars may extend between the windshield and the front doors. In other words, the A-pillars may be disposed at the front end of the passenger cabin. The first frame rail 14 and the second frame rail 16 may be directly or indirectly connected to the A-pillars, respectively. In the example shown in the figures, the first frame rail 14 and the second frame rail 16 are directly connected to the A-pillars. The B-pillars may extend behind the front doors, e.g., between adjacent front and rear doors. In other words, the B-pillars may be spaced from the A-pillars by a front door opening. The vehicle 10 may include additional pillars, e.g., C-pillars, D-pillars. The pillars 32 may extend from the roof to the floor.

The rockers 30 may be connected to one or more of the pillars 32. In the example shown in the Figures, the rocker 30 is connected to the A-pillar, B-pillar, and C-pillar. The rockers 30 are the lowest portion of the sides of the vehicle body 12. The rockers 30 extend along the vehicle-longitudinal axis, e.g., between wheels 34 of the vehicle 10. The rockers 30 may support a door of the vehicle 10 in a closed position. The rockers 30 may include a step to ease entry and egress to and from the vehicle 10.

The cross-brace 18 supports powertrain-electrification components 20, as described further below. The cross-brace 18 may be, for example, that shown in U.S. patent application Ser. No. 16/375,922, which is hereby incorporated by reference. For powertrain-electrification components 20 connected to the cross-brace 18, those powertrain-electrification components 20 may be connected to the cross-brace 18 using fasteners, e.g., bolts or other threaded fasteners.

The cross-brace 18 extends in the cross-vehicle direction C from the first frame rail 14 to the second frame rail 16. The cross-brace 18 may be elongated in the cross-vehicle direction C. The cross-brace 18 is separate from the first frame rail 14 and the second frame rail 16, i.e., is separately formed and subsequently connected to the first frame rail 14 and the second frame rail 16.

Figure 6:
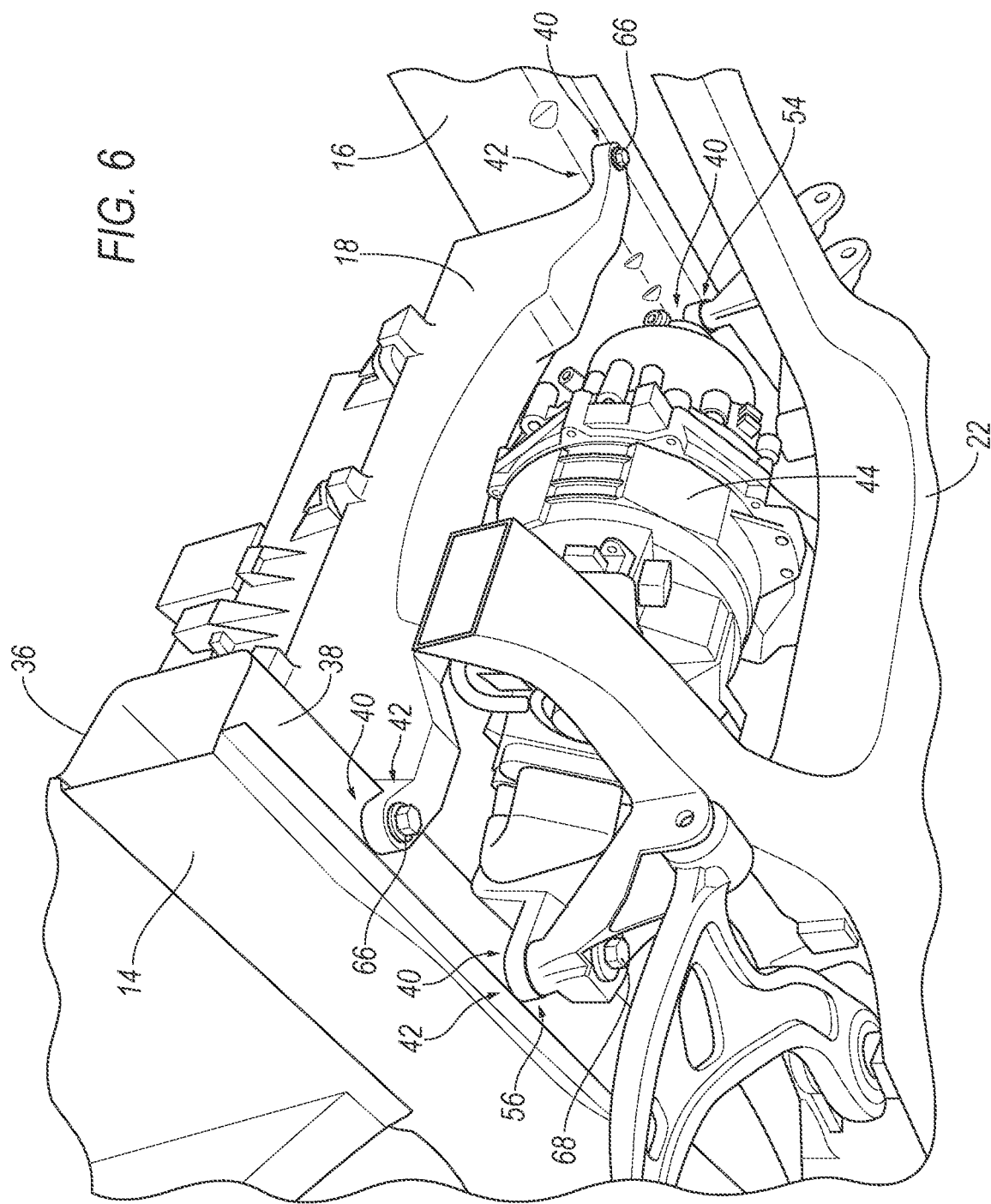
FIG. 6 is a cut-away view of the cross-brace, powertrain-electrification components, a portion of the body, and the subframe.

The cross-brace 18 is directly connected to the first frame rail 14 and the second frame rail 16. In other words, the cross-brace 18 abuts the first frame rail 14 and the second frame rail 16 or is connected to the first frame rail 14 and the second frame rail 16 by an intermediate component having the primary purpose to connect the cross-brace 18 to the first frame rail 14 and the second frame rail 16, e.g., a fastener, washer, vibration-dampening mount or bushing, etc. The cross-brace 18 may be directly connected to the first frame rail 14 and the second frame rail 16 with connection 40, which may include a removeable connector 66, e.g., a threaded fastener. In the example shown in the figures, the cross-brace 18 is connected to the first frame rail 14 and the second frame rail 16 with bolts, as best shown in FIGS. 3 and 6.

Figure 3:
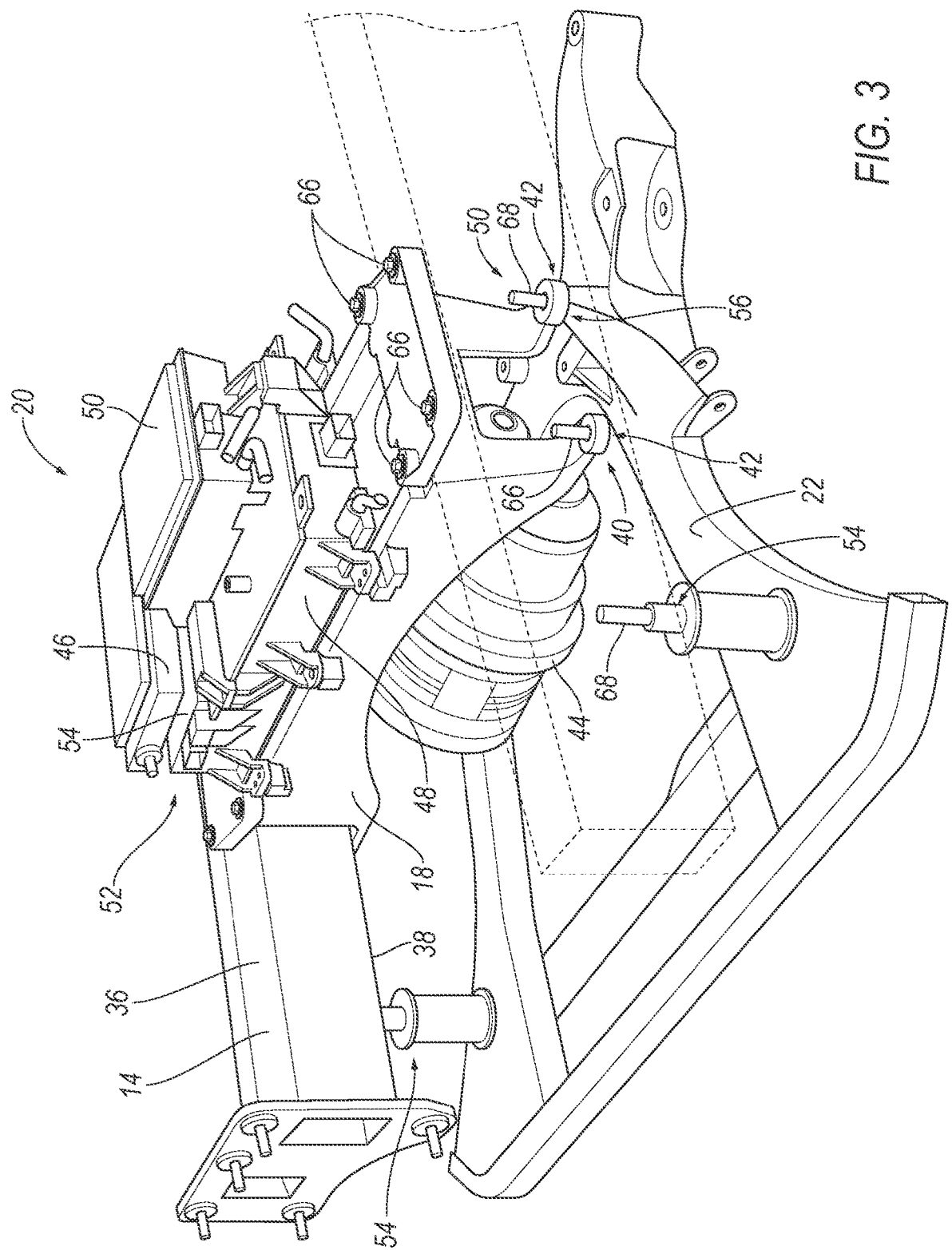
FIG. 3 is a perspective view of the cross-brace, powertrain-electrification components, a portion of the body, and a subframe connected to the cross-brace.

As best shown in FIG. 3, the cross-brace 18 may be connected to both an upper surface 36 (i.e., the surface that faces away from a ground surface upon which the vehicle 10 may travel) and a lower surface 38 (i.e., the surface that faces toward the ground surface) of the first frame rail 14 and the second frame rail 16. The cross-brace 18 may include mounting legs 42 that include the connections 40 to the first frame rail 14 and the second frame rail 16.

Once secured to the first frame rail 14 and the second frame rail 16, the cross-brace 18 structurally reinforces the vehicle body 12. As an example, mounting the cross-brace 18 to both the upper surface 36 and the lower surface 38 of the first frame rail 14 and the second frame rail 16 advantageously increases the stiffness and resistance to bending of the vehicle body 12, allows the cross-brace 18 to evenly distribute vehicle loads between the first frame rail 14 and the second frame rail 16, provide improved frontal impact consistency, and provides for improved flexibility during the vehicle assembly process.

The vehicle body 12 dampens vibration from the cross-brace 18. Specifically, vibration is transferred from the cross-brace 18 to the first frame rail 14 and the second frame rail 16 at the connections and the vehicle body 12 absorbs the vibration at the connections 40.

The cross-brace 18 provides a relatively flat, rigid surface for connecting and supporting the powertrain-electrification components 20 to reduce noise, vibration, and harshness and increase durability.

The cross-brace 18 may serve as a master electrical ground for the powertrain-electrification components 20. Accordingly, high voltage modules have a case ground to eliminate the need for external ground cables.

The cross-brace 18 may be metal, such as steel, aluminum, etc.; reinforced polymer, etc. The cross-brace 18 may be manufactured in a casting process, such as a low pressure die casting process. The cross-brace 18 may be cast (e.g., by using sand core technology) to include one or more hollow sections. Among other benefits, the hollow sections serve to reduce the weight of the cross-brace 18 to provide a relatively high strength to weight ratio. The wall thickness of the cross-brace 18 may vary across different sections of the component to provide an overall geometry that is optimized for a specific vehicle design.

Figure 4:
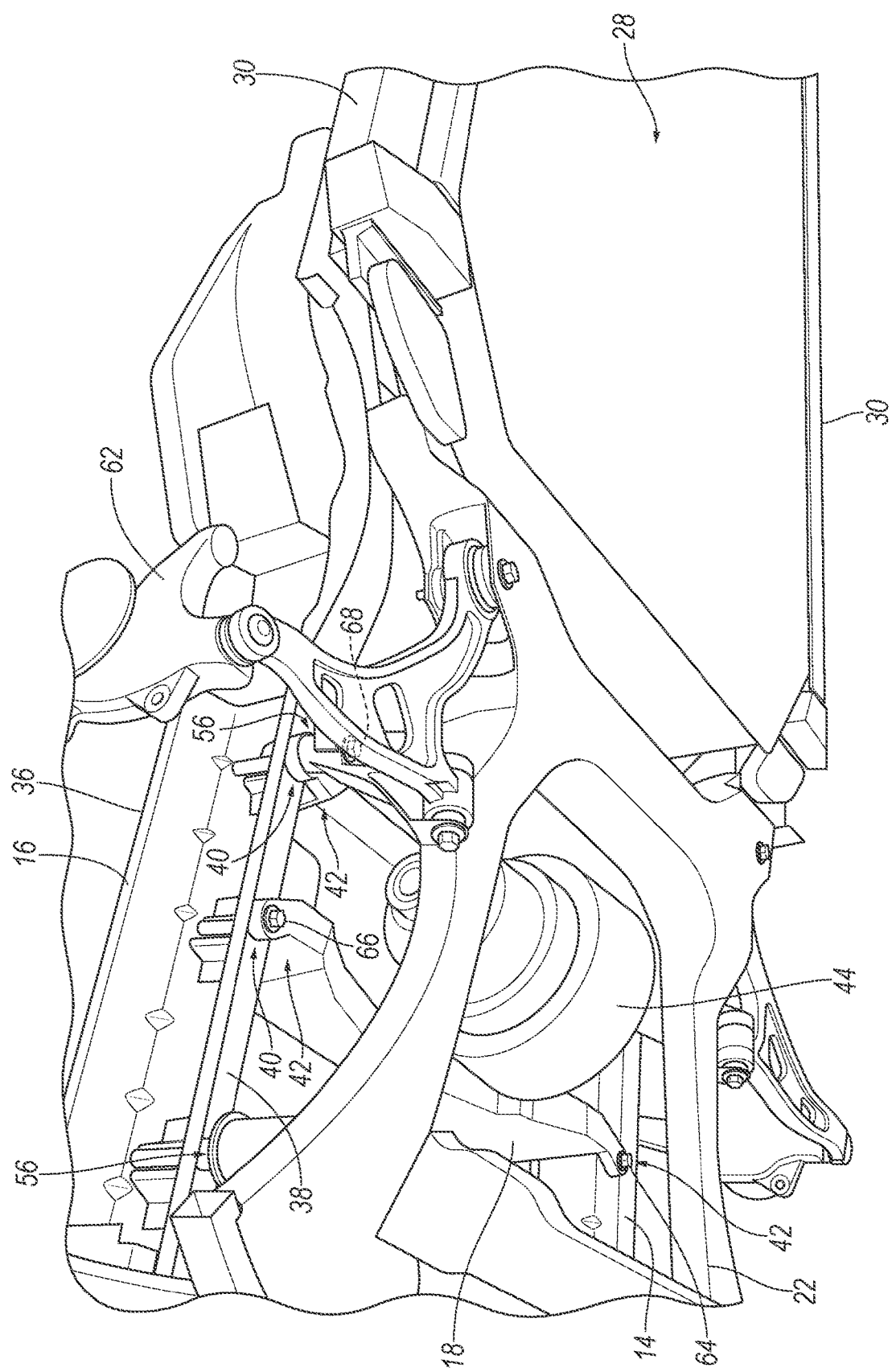
FIG. 4 is a bottom perspective view of the cross-brace, powertrain-electrification components, a portion of the body, and the subframe.
Figure 5:
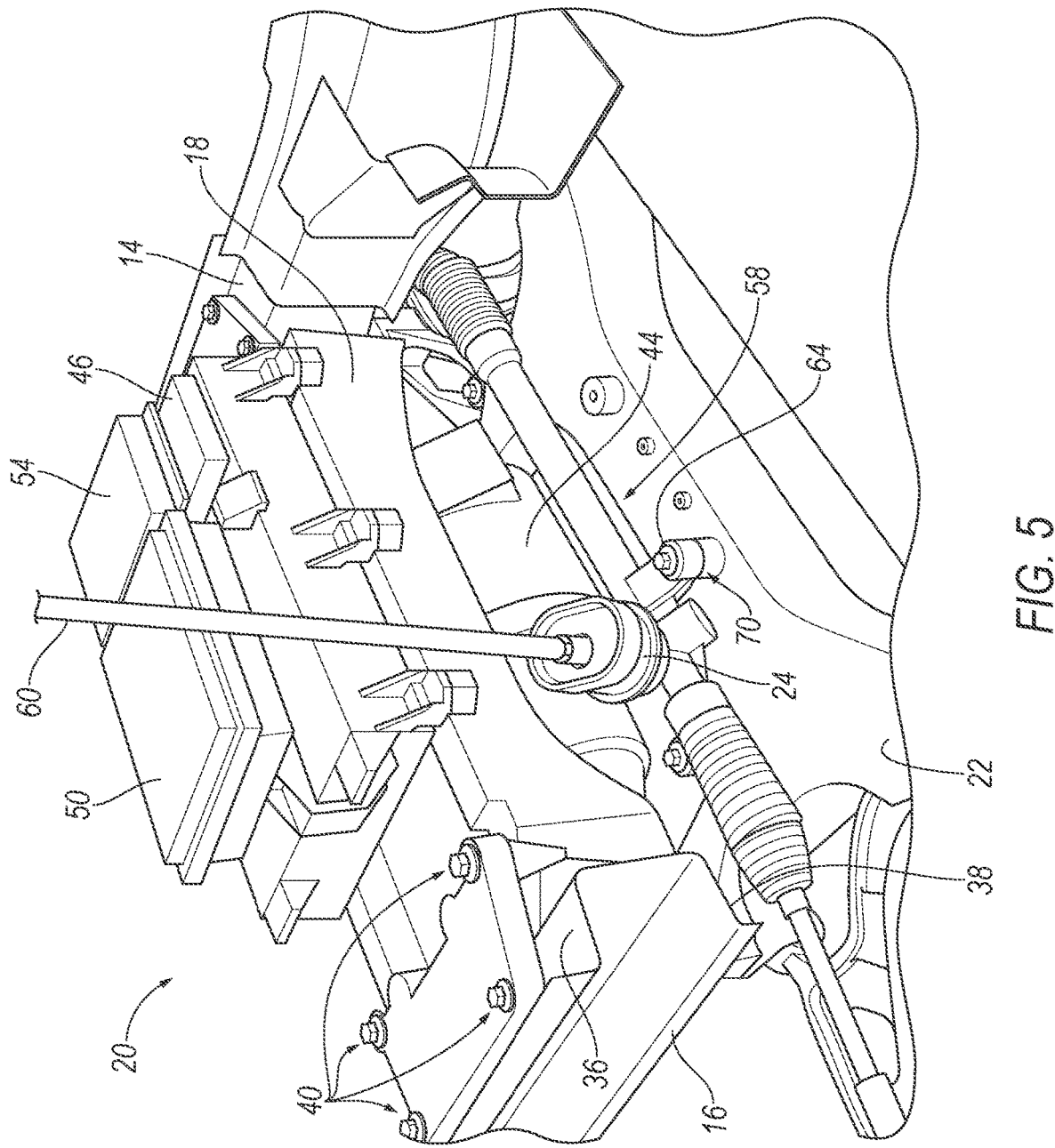
FIG. 5 is another perspective view of the cross-brace, powertrain-electrification components, a portion of the body, the subframe, and a portion of a vehicle-steering assembly connected to the subframe.
Figure 7:
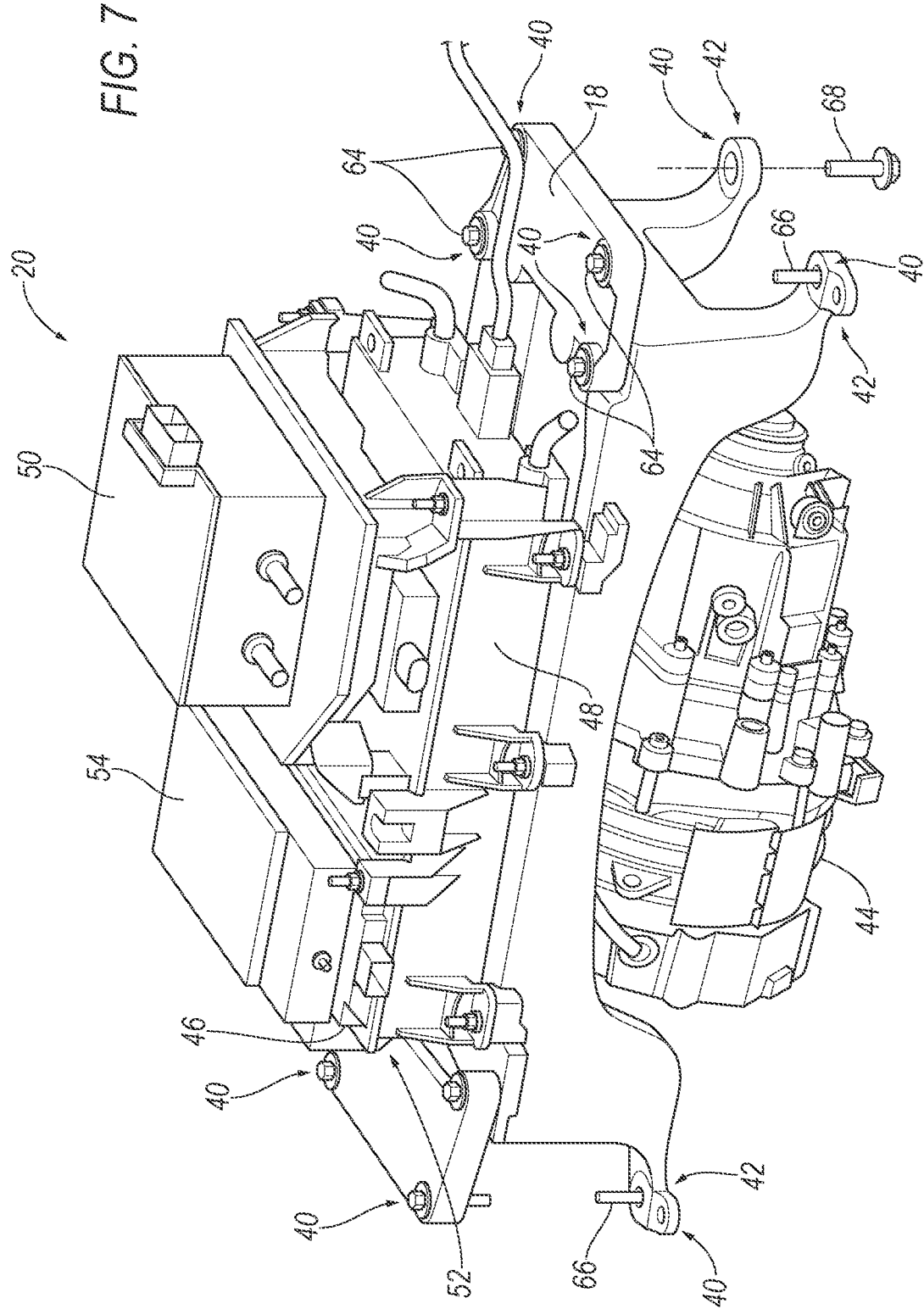
FIG. 7 is a perspective view of the cross-brace and powertrain-electrification components supported by the cross-brace.
Figure 8:
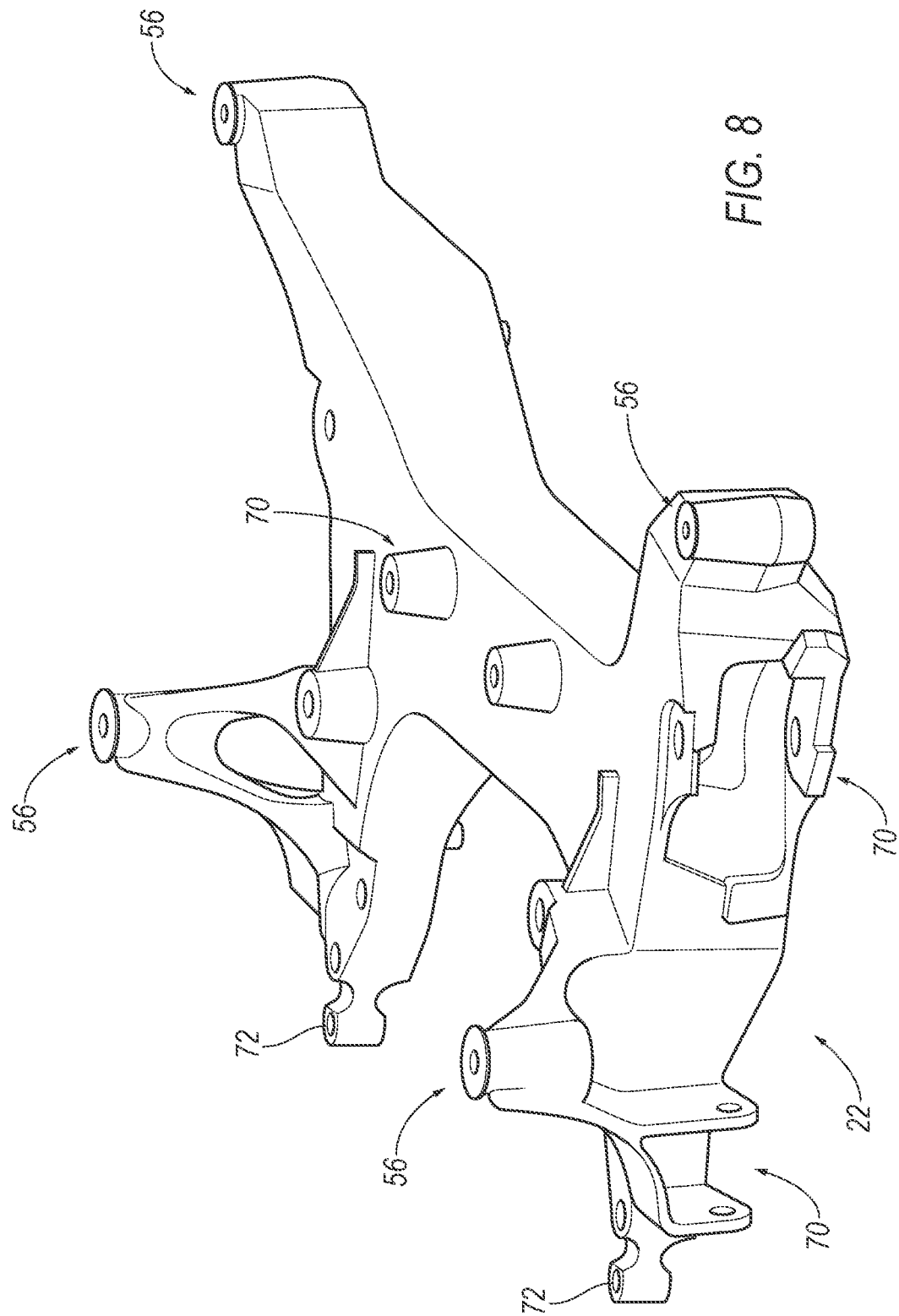
FIG. 8 is a perspective view of the subframe.
Figure 9:
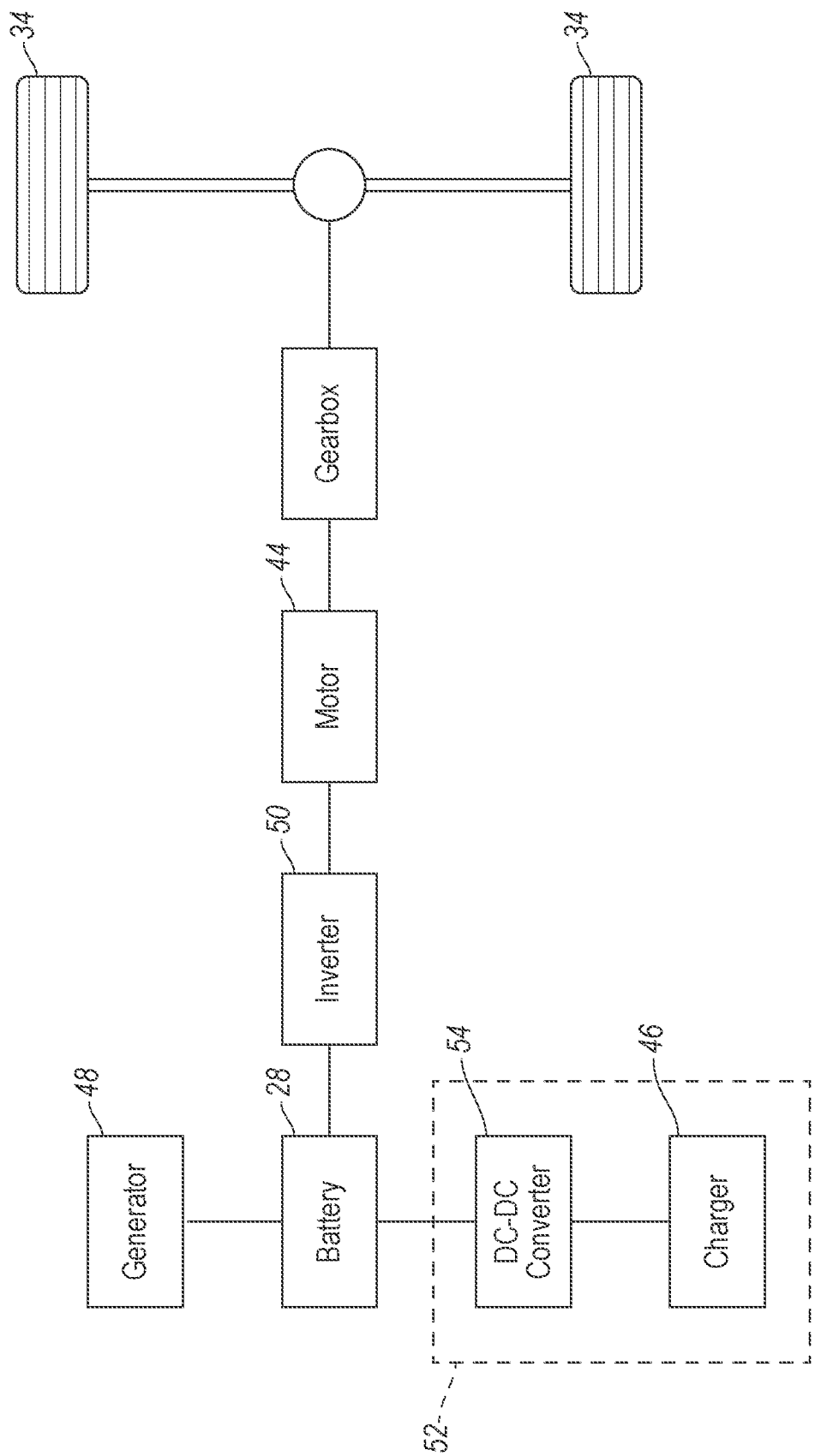
FIG. 9 is a schematic of a system of the vehicle.

With reference to FIGS. 3-7, the vehicle 10 may include a plurality of powertrain-electrification components 20. At least some of the powertrain-electrification components 20 are supported by the cross-brace 18. In other words, at least some of the powertrain-electrification components 20 may be directly connected to the cross-brace 18 and/or the weight of at least some of the powertrain-electrification components 20 may be borne by the cross-brace 18. In examples, in which the weight of one of the powertrain-electrification components 20 is borne by the cross-brace 18, the powertrain-electrification component 20 may be on top of the cross-brace 18, e.g., an electric-powertrain motor 44, an onboard charger 46, an onboard generator 48, etc., as best shown in FIGS. 3, 5, and 7. As another example in which the weight of one of the powertrain-electrification components 20 is borne by the cross-brace 18, the powertrain-electrification component 20 may be suspended from the cross-brace 18 below the cross-brace 18, e.g., an electric-powertrain motor 44, as best shown in FIG. 3-7. The powertrain-electrification components 20 deliver, manage, store, and/or control electrical power. The propulsion of the vehicle 10 is powered by at least some of the powertrain-electrification components 20.

With reference to FIGS. 3-7, the powertrain-electrification components 20 may include the electric-powertrain motor 44 introduced above. The electric powertrain motor 44 is electrically connected with the electric-vehicle battery 28. The electric-vehicle battery 28 supplies power to the electric-powertrain motor 44 to operate the electric-powertrain motor 44. The electric-powertrain motor 44 may include a gearbox or may be connected to a gearbox to adjust the torque and speed delivered from the electric-powertrain motor 44 to wheels of the vehicle 10. The electric-powertrain motor 44 is supported by the cross-brace 18. Specifically, the electric-powertrain motor 44 is connected to and suspended from the cross-brace 18 below the cross-brace 18. The electric-powertrain motor 44 may be between the cross-brace 18 and the subframe 22, e.g., below the cross-brace 18 and above the subframe 22, as shown in the figures.

The powertrain-electrification components 20 may include an inverter 50 that connects the electric-powertrain motor 44 to the electric-vehicle battery 28. In the example shown in the figures, the inverter 50 is supported by the cross-brace 18. Specifically, the weight of the inverter 50 is borne by the onboard electric generator 48 and the onboard electric generator 48 is connected to the cross-brace 18 and the weight of the onboard generator 48 is borne by the cross-brace 18. Accordingly, the weight of the inverter 50 is borne by the cross-brace 18 through the onboard electric generator 48.

With reference to FIGS. 3, 5, and 7, the vehicle 10 may include a charging system 52 for charging the electric-vehicle battery 28. The charging system 52 may include components that are located both onboard the vehicle 10 and external to the vehicle 10 (e.g., electric vehicle supply equipment (EVSE), etc.). The charging system 52 can be connected to an external power source (e.g., a wall outlet, a charging station, etc.) for receiving and distributing power received from the external power source throughout the vehicle 10.

The powertrain-electrification components 20 supported by the cross-brace 18 may include at least some components of the onboard charging system. Specifically, the powertrain-electrification components 20 may include the onboard battery charger 46. In the example shown in the figures, the onboard battery charger 46 is supported by the cross-brace 18. The onboard battery charger 46 charges the electric-vehicle battery 28, e.g., from an external power source. For example, the onboard battery charger 46 may be of a plug-in type that uses alternating current to charge the battery 28, as described above.

The onboard charging system 52 components may include a DC-DC converter 54. In the example shown in the figures, the powertrain-electrification components 20 include the DC-DC converter 54 and the DC-DC converter 54 is supported by the cross-brace 18. Specifically, in the example shown in the figures, the weight of the DC-DC converter 54 is borne by the onboard battery charger 46 and the onboard battery charger 46 is connected to the cross-brace 18 and the weight of the onboard battery charger 46 is borne by the cross-brace 18.

The powertrain-electrification components 20 may include the onboard electric generator 48. The onboard electric generator 48 is connected to the electric-vehicle battery 28. The onboard electric generator 48 may supply power to external electrical devices that are electrically connected to the onboard electric generator 48, e.g., that are removeably plugged in to the onboard electric generator 48. Specifically, the onboard electric generator 48 may supply power from the electric-vehicle battery 28 to an external electric devices. In the example shown in the figure, the onboard electric generator 48 is supported by the cross-brace 18.

The electric-vehicle battery 28 of the electric vehicle 10 powers propulsion of the electric vehicle 10, e.g., powers the electric-powertrain motor 44. Examples of electric vehicles include a battery-electric vehicle (BEV), a hybrid-electric vehicle (HEV), a plug-in hybrid electric vehicles (PHEV), etc.

The electric-vehicle battery 28 may include one or more battery modules (not numbered). Each battery module may include one or more battery cells. The electric-vehicle battery 28 may include any suitable hardware, e.g., wiring, connectors, circuits, etc., connecting the battery modules to each other and to powertrain-electrification components 20 of the vehicle 10.

The electric-vehicle battery 28 may be supported by the vehicle body 12 between the rockers 30. For example, the vehicle 10 may include a battery tray (not numbered) and at least one battery module fixed to the battery tray. The battery tray may include a battery compartment (not numbered) that receives the battery modules. The battery 28 may include any suitable hardware, e.g., wiring, connectors, circuits, etc., connecting the battery modules to each other and to powertrain-electrification components 20 of the vehicle 10.

The battery tray may be rectangular, or any suitable shape. The battery tray may be metal or any suitable materiel. The battery tray is supported by the vehicle body 12. The battery tray may be fixed to the vehicle body 12, e.g., to the rockers 30, via welding, fasteners, etc. Additionally or alternatively, one or more intermediary structures, e.g., beams, brackets, etc., may fix the battery tray to the vehicle body 12.

The battery tray may include a bottom panel (not numbered) and/or a top panel (not numbered). The bottom panel and the top panel may enclose the electric-vehicle battery 28. In such an example, the battery compartment is defined between the bottom panel and the top panel. The bottom panel may be exposed to the road surface and may prevent intrusion of precipitation and dirt to the battery modules. The top panel may separate the battery compartment from components of the vehicle 10 above the vehicle 10-battery assembly, e.g., a passenger compartment.

With reference to FIGS. 3-6 and 8, the subframe 22 supports vehicle components, e.g., steering components, suspension components, etc. The subframe 22 may include beams, panels, etc. The subframe 22 may be metal or any material of sufficient strength and rigidity. The subframe 22 is separate from the vehicle body 12. The subframe 22 is connected to the vehicle body 12. For example, the subframe 22 may be welded to the vehicle body 12, bolted to the vehicle body 12, fixed to the vehicle body 12 with a bracket, a beam, etc. The subframe 22 may be at the front end of the vehicle 10. For example, the subframe 22 may be in front of the passenger cabin.

The subframe 22 is directly connected to the cross-brace 18. In other words, the subframe 22 abuts the cross-brace 18 or is connected to the cross-brace 18 by an intermediate component having the primary purpose to connect the subframe 22 to the cross-brace 18, e.g., a fastener, washer, vibration-dampening mount or bushing, etc. The subframe 22 may be directly connected to the cross-brace 18 at connections 56 that may include as removeable connectors 68, e.g., threaded fasteners. In the example shown in the figures, the subframe 22 is connected to the cross-brace 18 with bolts, as best shown in FIGS. 3 and 6. In the example shown in the figures, the subframe 22 is connected to first frame rail 14 at two connections 56 and is connected to the second frame rail 16 at two connections 56.

As set forth above, the direct connection of the subframe 22 to the cross-brace 18 dampens vibration of the subframe 22 and reduces vibration transmitted to the vehicle-steering gear 24 to reduce noise, vibration, and harshness (NVH) felt by the vehicle occupant.

The subframe 22 may also be connected directly to the body 12. For example, as shown in FIG. 4, the subframe 22 is directly connected to the rockers 30. In that example, the rocker 30 includes a connector that abuts and connects to the subframe 22, e.g., by welding and/or threaded fasteners. The subframe 22 may include connections 72 (FIG. 8) that connect to the rockers 30. The connections 72 may include a removeable connector, e.g., a threaded fastener, that engages the subframe 22 and the rocker 30.

The vehicle 10 includes a steering system 58 controls the turning of the wheels. The steering system 58 is in communication with and receives input from the steering wheel 26 and/or a vehicle computer. The steering subsystem may include a rack-and-pinion system or a recirculating ball system with electric power-assisted steering, a steer-by-wire system, or any other suitable system.

The steering system 58 includes a vehicle-steering gear 24, as shown in FIG. 5. The steering gear turns the wheels of the vehicle 10 based on input, e.g., input from the steering wheel 26 and/or the computer. For example, the steering gear transmits rotation of the steering wheel 26 to the wheels of the vehicle 10.

The steering system 58 includes a steering shaft 60 connected to the vehicle-steering gear 24 and the steering wheel 26. The steering shaft 60 transmits rotation from the steering wheel 26 to the steering gear 24. The steering shaft 60 may include more than one segment with multiple segments connected by universal joints. The steering shaft 60 and/or the steering wheel 26 may be supported by an instrument panel (not numbered) in the passenger compartment.

As set forth above, the steering system 58 may be a rack-and-pinion system. In such an example, the vehicle-steering gear 24 includes a rack-and-pinion assembly, as is known. In such an example, rotation of the steering wheel 26 and steering shaft 60 rotates the pinion to translate the rack, which steer the vehicle wheels 34. As another example, the steering system 58 may be a recirculating ball system. In such an example, the vehicle-steering gear 24 includes a recirculating-ball assembly. The recirculating-ball assembly includes a ball nut rack that houses ball bearings that rotate a worm gear to translate a shaft that steers the vehicle wheels 34.

The steering system 58 includes a steering arm 62 rotatably connected to the subframe 22, as best shown in FIG. 4. The steering arm 62 is operatively coupled to the vehicle-steering gear 24. Specifically, operation of the steering gear 24 turns the steering arm 62 to steer the vehicle wheels 34. The steering arm 62 may be coupled to the vehicle-steering gear 24 with the rack of the rack-and-pinion assembly, with the shaft of the recirculating-ball assembly, etc. The subframe 22 includes steering-arm mounts 70 that rotatably engage the steering arm 62, e.g., with bolt, bushing, coupling, etc.

The vehicle-steering gear 24 is supported by the subframe 22. For example, the weight of the vehicle-steering gear 24 may be borne by the subframe 22. The vehicle-steering gear 24 is connected to the subframe 22. Specifically, vibration from the subframe 22 can transmit through the vehicle-steering gear 24, through the steering shaft 60, to the steering wheel 26, which can be felt by a vehicle 10 occupant. As an example, the vehicle-steering gear 24 may abut the subframe 22 and may be directly connected to the subframe 22 with fasteners that engage both the vehicle-steering gear 24 and the subframe 22. A connection 64 between the vehicle-steering gear 24 and the subframe 22 is shown, for example, in FIG. 5. The dampening of vibration of the subframe 22 by direct connection of the subframe 22 with the cross-brace 18 reduces vibration felt by the occupant through a steering wheel 26. Accordingly, direct connection of the subframe 22 to the cross-brace 18 dampens vibration to reduce vibration delivered to the vehicle-steering gear 24 through the subframe 22 from the rest of the vehicle 10, such as road vibrations from wheels 34 of the vehicle 10.

In the example shown in the figures, the vehicle-steering gear 24 is above the subframe 22. Specifically, the vehicle-steering gear 24 is connected to a top surface of the subframe 22 such that the subframe 22 is between the vehicle-steering gear 24 and the driving surface. The subframe 22 may be below the first frame rail 14 and the second frame rail 16. The vehicle-steering gear 24 may be vertically between the subframe 22 and the first frame rail 14 and second frame rail 16. Specifically, the vehicle-steering gear 24 may be above the subframe 22 and below the first frame rail 14 and the second frame rail 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle comprising:
a first frame rail and a second frame rail spaced from each other in a cross-vehicle direction and each elongated in a vehicle-longitudinal direction;
a cross-brace directly connected to the first frame rail and the second frame rail;
a powertrain-electrification component supported by the cross-brace;
a vehicle subframe directly connected to the cross-brace; and
a vehicle-steering gear connected to the vehicle subframe.

2. The vehicle as set forth in claim 1, wherein the powertrain-electrification component is an electric powertrain motor.

3. The vehicle as set forth in claim 1, wherein the powertrain-electrification component includes an onboard battery charger.

4. The vehicle as set forth in claim 3, further comprising an electric-vehicle battery in electrical communication with the onboard battery charger.

5. The vehicle as set forth in claim 4, further comprising an electric-powertrain motor electrically connected with the electric-vehicle battery.

6. The vehicle as set forth in claim 1, further comprising a steering shaft connected to the vehicle-steering gear and a steering wheel connected to the steering shaft.

7. The vehicle as set forth in claim 1, wherein the vehicle-steering gear includes a rack-and-pinion assembly.

8. The vehicle as set forth in claim 1, wherein the vehicle-steering gear includes a recirculating-ball assembly.

9. The vehicle as set forth in claim 1, further comprising a vehicle body including the first frame rail and the second frame rail, the vehicle body having a unibody architecture.

10. The vehicle as set forth in claim 1, further comprising a steering arm rotatably connected to the vehicle subframe and operatively coupled to the vehicle-steering gear.

11. The vehicle as set forth in claim 1, wherein the vehicle subframe is connected to the first frame rail at two connections and is connected to the second frame rail at two connections.

12. The vehicle as set forth in claim 11, further comprising a vehicle body including the first frame rail and the second frame rail, the vehicle body including rockers elongated in the vehicle-longitudinal direction, the vehicle subframe being connected to rockers.

13. The vehicle as set forth in claim 12, further comprising an electric-vehicle battery supported by the vehicle body between the rockers.

14. The vehicle as set forth in claim 1, further comprising a vehicle body including the first frame rail and the second frame rail, the vehicle body including rockers elongated in the vehicle-longitudinal direction, the vehicle subframe being connected to rockers.

15. The vehicle as set forth in claim 14, further comprising an electric-vehicle battery supported by the vehicle body between the rockers.

16. The vehicle as set forth in claim 1, wherein the first frame rail and the second frame rail are above the vehicle subframe.

17. The vehicle as set forth in claim 16, wherein the vehicle-steering gear is above the vehicle subframe and below the first frame rail and the second frame rail.

18. The vehicle as set forth in claim 16, wherein the powertrain-electrification component includes an electric-powertrain motor below the cross-brace and above the vehicle subframe.

19. The vehicle as set forth in claim 1, wherein the steering gear is spaced from the cross-brace.

20. The vehicle as set forth in claim 1, wherein:
the first frame rail and the second frame rail each have a bottom surface;
a connector extends through the subframe, the cross-brace, and the bottom surface of the first frame rail; and
another fastener extends through the subframe, the cross-brace, and the bottom surface of the second frame rail.

* * * * *